US012683103B2

(12) United States Patent
Einschenk

(10) Patent No.: US 12,683,103 B2
(45) Date of Patent: Jul. 14, 2026

(54) RAPID SAFETY SWITCH AND RAPID SAFETY SWITCH SYSTEM

(71) Applicant: Siemens Aktiengesellschaft, Munich (DE)

(72) Inventor: Jürgen Einschenk, Panketal (DE)

(73) Assignee: Siemens Aktiengesellschaft, Munich (DE)

( * ) Notice: Subject to any disclaimer, the term of this patent is extended or adjusted under 35 U.S.C. 154(b) by 274 days.

(21) Appl. No.: 18/556,718

(22) PCT Filed: Apr. 1, 2022

(86) PCT No.: PCT/EP2022/058781
§ 371 (c)(1),
(2) Date: Oct. 23, 2023

(87) PCT Pub. No.: WO2022/223265
PCT Pub. Date: Oct. 27, 2022

(65) Prior Publication Data

US 2024/0242906 A1 Jul. 18, 2024

(30) Foreign Application Priority Data

Apr. 23, 2021 (DE) ..................... 10 2021 204 082.9

(51) Int. Cl.
*H01H 3/30* (2006.01)
*H01H 31/00* (2006.01)
(Continued)

(52) U.S. Cl.
CPC ........ *H01H 31/003* (2013.01); *H01H 3/3052* (2013.01); *H01H 71/02* (2013.01); *H01H 71/24* (2013.01)

(58) Field of Classification Search
CPC ............. H01H 1/36; H01H 2001/5827; H01H 3/3052; H01H 31/003; H01H 31/04;
(Continued)

(56) References Cited

U.S. PATENT DOCUMENTS 4,317,094 A * 2/1982 Peterson ................ H01H 51/08
335/166
5,006,682 A * 4/1991 Sloff .................... H01H 3/3052
200/429
(Continued)

FOREIGN PATENT DOCUMENTS

AT 357211 B 6/1980
DE 102018216210 A1 3/2020
(Continued)

*Primary Examiner* — William A Bolton
(74) *Attorney, Agent, or Firm* — Laurence A. Greenberg; Werner H. Stemer; Ralph E. Locher

(57) ABSTRACT

A rapid safety switch has a switch housing. The switch housing has six outer housing faces, including a front housing face, an open rear housing face, an upper housing face, a lower housing face, a first housing face, and a second housing face. An operating tool interface can be operated through one of the outer housing faces. The switch further includes one or more connection elements for controlling the rapid safety switch. The rapid safety switch can be unlatched by an electromagnetic trigger, and the rapid safety switch has a moving contact.

9 Claims, 7 Drawing Sheets

(51) Int. Cl.
*H01H 71/02* (2006.01)
*H01H 71/24* (2006.01)

(58) Field of Classification Search
CPC ........ H01H 31/06; H01H 31/08; H01H 31/10; H01H 71/02; H01H 71/24; H01H 71/08; H01H 71/505; H01H 71/52; H01H 71/2463
USPC ................................................ 218/1, 2, 4, 5
See application file for complete search history.

(56) References Cited

U.S. PATENT DOCUMENTS

| | | | | |
|---|---|---|---|---|
| 6,563,409 | B2 * | 5/2003 | Gruner | H01H 51/2209 335/106 |
| 6,794,968 | B2 * | 9/2004 | Arnholt | H01H 51/2209 335/229 |
| 8,957,342 | B2 * | 2/2015 | McCord | H01H 33/38 335/185 |
| 9,756,740 | B2 * | 9/2017 | Loong | H05K 5/0052 |
| 11,527,377 | B2 | 12/2022 | Einschenk et al. | |
| 2013/0334023 | A1 * | 12/2013 | Miller | H01H 31/003 200/52 R |
| 2016/0279599 | A1 * | 9/2016 | Kirk | B01J 20/3085 |
| 2016/0343527 | A1 * | 11/2016 | McTigue | H01H 50/023 |

FOREIGN PATENT DOCUMENTS

| | | | |
|---|---|---|---|
| EP | 1617447 | A1 | 1/2006 |
| EP | 2677530 | A2 | 12/2013 |
| FR | 2730357 | A1 | 8/1996 |

* cited by examiner

RAPID SAFETY SWITCH AND RAPID SAFETY SWITCH SYSTEM

FIELD AND BACKGROUND OF THE INVENTION

The invention relates to a rapid safety switch and to a system having such a safety switch.

Safety switches, also referred to as a ground electrode or short-circuiting switch, are known for extinguishing arcs in the event of a defect in particular in the medium-voltage sector, thus between 1000 V and approximately 52.5 kV. However, there is also demand for such safety switches below nominal voltages of 1000 V.

Apparatuses for medium-voltage applications which by means of a single-pole switch and an explosive charge as drive means achieve switching times of less than 5 ms are known from the prior art. The switch cannot be re-used after having been triggered.

A system in which an electromagnetic drive switches three poles in one procedure is also known, wherein the construction of the switch in this case is complex.

A device having an electromagnetic unlatching mechanism, a releasing mechanism, and a spring drive is also known.

The use of a magnetic trigger with a latching mechanism according to DE 10 2018 216210 A1 is known.

SUMMARY OF THE INVENTION

It is an object of the invention to provide an improved safety switch which eliminates disadvantages of the prior art.

One exemplary embodiment relates to a rapid safety switch, wherein the rapid safety switch has a switch housing, the switch housing having:

- six housing external sides, having a housing front side, an open housing rear side, a housing upper side, a housing lower side, a first housing side, and a second housing side;
- an operating-tool interface which is able to be operated via one of the housing external sides; and
- one or more connection elements for controlling the rapid safety switch;

the rapid safety switch is able to be unlatched by an electromagnetic release mechanism, and the rapid safety switch has a moving contact, in particular a single moving contact, which is movable by means of a spring accumulator, wherein the spring accumulator is latched in a biased position, and the latching mechanism is able to be released by the electromagnetic release mechanism;

the moving contact is designed in such a manner that the moving contact in a first position:

- is connected in an electrically conducting manner to a fourth terminal; and
- is disposed so as to be electrically isolated from a first terminal and a second terminal and a third terminal;

and in that the moving contact in a second position:

- is connected in an electrically conducting manner to a fourth terminal; and
- is disposed so as to contact in an electrically conducting manner the first terminal and the second terminal and the third terminal;

wherein the rapid safety switch by way of unlatching by the electromagnetic release mechanism is able to be transferred from the first position to the second position, and wherein the rapid safety switch by way of the operating-tool interface is able to be transferred from the second position to the first position. This safety switch is in particular conceived for operating voltages below 1000 V.

It is preferable for the rapid safety switch to have a first fixed contact assembly, a second fixed contact assembly and a third fixed contact assembly, wherein the first fixed contact assembly is connected in an electrically conducting manner to the first terminal, the second fixed contact assembly is connected in an electrically conducting manner to the second terminal, and the third fixed contact assembly is connected in an electrically conducting manner to the third terminal,

- and the moving contact, when transitioning from the first position to the second position, is designed so as to contact almost simultaneously, thus preferably within 1 ms, the first fixed contact assembly, the second fixed contact assembly, and the third fixed contact assembly, so that the first fixed contact assembly, the second fixed contact assembly and the third fixed contact assembly are connected in an electrically conducting manner almost simultaneously to one another and the fourth terminal.

It is also preferable for the moving contact to have a first extent, a second extent, and a third extent, wherein the first extent lies parallel to the moving directions of the moving contact, and the moving contact along the first extent has a thickening in the third extent, wherein the first fixed contact assembly, the second fixed contact assembly and the third fixed contact assembly in the second position electrically contact the moving contact on the thickening.

It is also preferable for the first fixed contact assembly, the second fixed contact assembly and the third fixed contact assembly in the first position of the moving contact to be disposed in such a manner on the region of the moving contact, which is thinner in comparison to the thickening, that the first fixed contact assembly, the second fixed contact assembly and the third fixed contact assembly in the first position are spaced apart from the moving contact and do not electrically contact the moving contact.

It is furthermore preferable for the first fixed contact assembly to have a first first fixed contact on a first side of the moving contact, and to have a second first fixed contact on the first side of the moving contact;

- for the second fixed contact assembly to have a first second fixed contact on a second side of the moving contact, and to have a second second fixed contact on the second side of the moving contact; and
- for the third fixed contact assembly to have a first third fixed contact on the first side of the moving contact, and to have a second third fixed contact on a second side of the moving contact. This has the effect of a uniform load on the moving contact and a uniform impingement by force of the latter when contacting the fixed contacts.

It is also preferable for the first fixed contact assembly, the second fixed contact assembly and the third fixed contact assembly to be in each case impinged by a force and disposed in such a manner that the first fixed contact assembly, the second fixed contact assembly and the third fixed contact assembly in the first position each do not electrically contact the moving contact, and in the second position electrically contact the moving contact and are in each case pushed onto the moving contact by a holding force.

It is also preferable for each of the fixed contact assemblies to be formed by a conductor line/contact combination, wherein the conductor line/contact combination is in each case formed by

- a moving element which is formed by one or more of a woven-fabric tape or strands or blades; wherein the moving element
  - has a first moving element end and a second moving element end; and
  - the first moving element end has a first moving element connection which is formed by means of welding, pressing and/or soldering/brazing, and the second moving element end has a second moving element connection which is formed by means of welding, pressing and/or soldering/brazing;
- a fixed contact which is disposed on the first moving element connection or the second moving element connection;

wherein the fixed contact is able to be disposed so as to be movable by the moving element.

Able to be disposed so as to be movable herein means that the fixed contact, when assembled in an orderly manner, has a mobility which permits in particular a restricted evasive movement in which the fixed contact, when a moving contact impacts the fixed contact, is permitted a restricted evasive movement away from the moving contact, in particular an evasive movement perpendicular to a moving direction of the moving contact. In other words, able to be disposed so as to be movable herein means that the fixed contact is movable by the moving element, in particular the fixed contact can perform an evasive movement in relation to the moving contact, in particular perpendicularly to the moving direction of the moving contact. The fixed contact is thus not an actively moving element, but an element which is able to be moved by the moving contact, and is designed in particular so as to perform a restricted evasive movement.

The fixed contact herein can be formed completely by the fixed contact finger or fingers, or by even further elements such as a fixed contact finger support, a fixed contact support, or have an evasive movement restriction.

Segmenting, or splitting, the fixed contact into individual fixed contact fingers in such a way leads to more reliable contacting between the moving contact and the fixed contact.

It is in particular preferable for the fixed contact to have two or more fixed contact fingers, wherein

- the fixed contact fingers are connected to the first moving element end or the second moving element end; and
- the first moving element end or the second moving element end, which is connected to the fixed contact fingers, conjointly with a first moving element portion of the moving element is slotted, thus segmented, in such a manner that the first moving element end or the second moving element end, which is connected to the fixed contact fingers, has moving element end segments, and only one fixed contact finger is in each case connected to a respective moving element end segment.

This enables in particular an independent mobility of the fixed contact fingers among one another, which furthermore enhances the reliability of the construction. Slotted herein means a separation, in particular a segmentation.

It is particularly preferable for each of the two or more fixed contact fingers to be in each case connected to a moving element segment by soldering/brazing, welding, or pressing.

It is also preferable for each of the two or more fixed contact fingers to have a first receptacle for an evasive movement restriction. This enables a defined, thus predetermined, permissible evasive movement, in particular without compromising secure, thus reliable, contacting.

It is also preferable for each of the two or more fixed contact fingers to have a second receptacle for a fixed contact finger support. Such a second receptacle for a fixed contact finger support enables a modular pre-fabrication, thus the possibility of assembling the fixed contacts in a fixed contact finger support as a module, and of then simply integrating this module in a predefined contact system. Such pre-assembling reduces assembly costs, assembly time and assembly reliability, thus reducing defect sources, in particular when such pre-assembled modules are separately tested.

It is furthermore preferable for a fastening means receptacle to be provided on the first moving element end or the second moving element end which is not connected to the fixed contact. Such a fastening means receptacle enables the conductor line/contact combination to be easily connected to a contact system, in particular without requiring a materially integral connection.

It is also preferable for one or more force-introduction points to be provided on the fixed contact. Such force-introduction points enable a force, in particular a spring force, to be applied to the fixed contact, which force is preferably directed counter to the possible direction of the evasive movement. In this way, an additional contact pressure between the fixed contact and a moving contact can be generated in the state in which the moving contact electrically contacts the fixed contact. The direction of the evasive movement is in particular perpendicular to the direction of movement of the moving contact.

It is also preferable for each conductor line/contact combination to be disposed in a U-shaped manner, by way of a first leg of the U, thus of the U-shape, and a second leg of the U, thus of the U-shape, such that, in the second position of the rapid safety switch, a current flowing through the conductor line/contact combinations causes a repellant force between the respective first leg of the U and the second leg of the U, and in this way pushes in each case the fixed contact against the moving contact, thus increasing the contact pressure.

The moving element and the fixed contact herein form in particular the U-shape, i.e. the first moving element connection or the second moving element connection preferably forms a first leg of the U-shape, and the fixed contact preferably forms a second leg of the U-shape.

It is also preferable for the first terminal, the second terminal, the third terminal and the fourth terminal to be disposed on a side opposite the electromagnetic release mechanism, and the moving contact to be connected to the fourth terminal by way of one or more conductor lines. The current supply to the moving contact thus takes place from the same side as the connections for the fixed contacts.

In terms of the installation according to the invention, all explanations made above and hereunder with reference to the method according to the invention also apply conversely in an analogous manner; in particular, the installation according to the invention is specified for carrying out the method according to the invention in any arbitrary embodiment, or in a combination of arbitrary embodiments. In terms of the advantages of the installation according to the invention, reference is also made to the advantages pertaining to the method according to the invention.

The invention will be explained in more detail hereunder by means of an exemplary embodiment. The specific design embodiment of the exemplary embodiment is not to be understood as in any way limiting the general design embodiment of the method according to the invention and the installation according to the invention; rather, individual features of the design embodiment of the exemplary embodiment can be freely combined with one another and with the above-described features in an arbitrary manner.

DETAILED DESCRIPTION OF THE INVENTION

Figure 1:
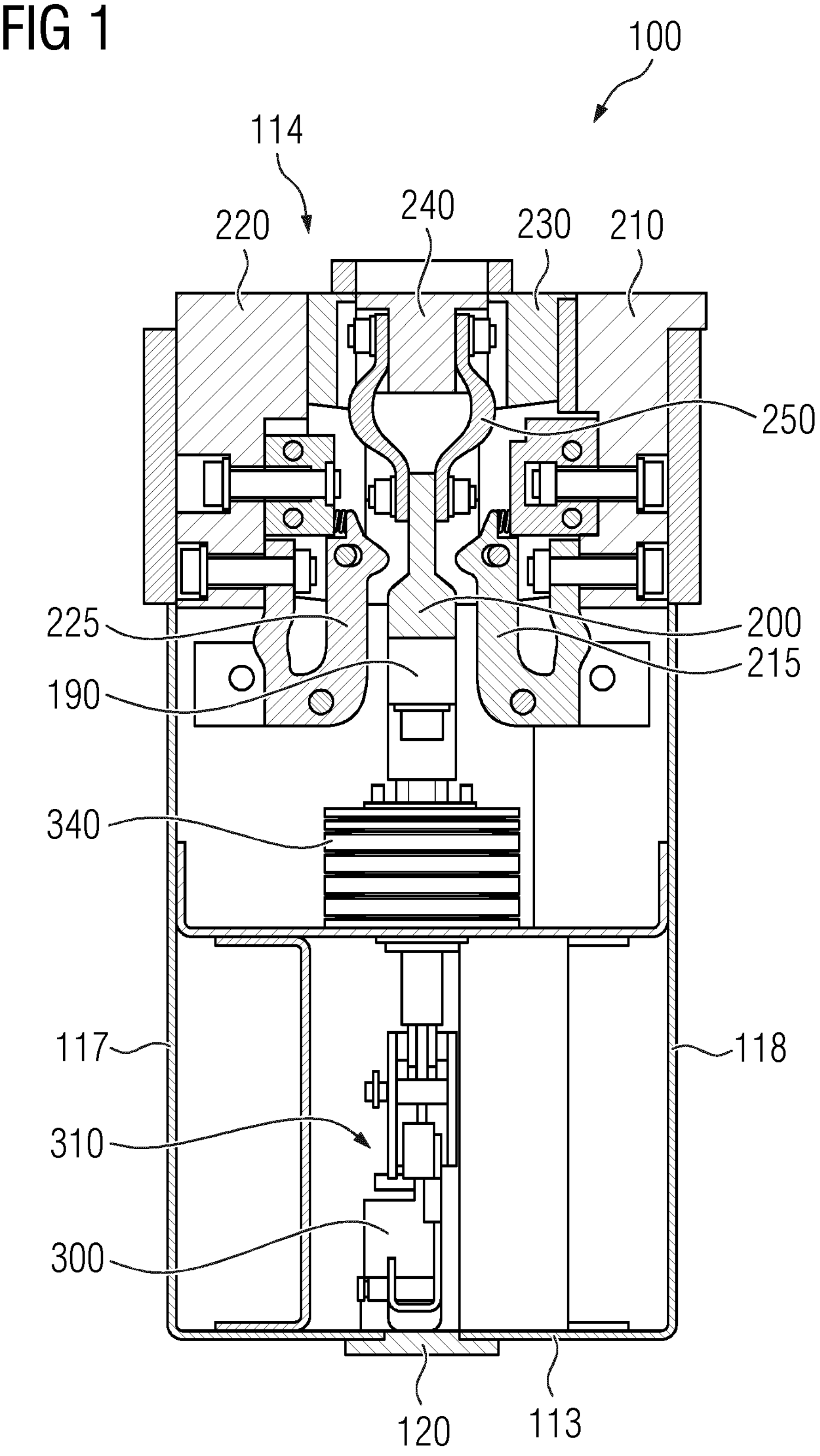
FIG. 1: shows a schematic sectional illustration of a safety switch according to the invention in the open and latched state.

FIG. 1 shows a schematic sectional illustration of a safety switch 100 according to the invention in the open and latched state.

The safety switch 100 has a housing, wherein an open housing rear side 114, a first housing side 117, a second housing side 118 and a housing front side of the housing are visible in FIG. 1. The housing upper side 115 and the housing lower side 116 are not illustrated in FIG. 1.

In the open state illustrated in FIG. 1, the fixed contacts 215, the first first fixed contact 215 and the first second fixed contact 225 being visible here, do not contact the moving contact 200, i.e. the fixed contacts 215 are electrically separated, i.e. isolated, from the moving contact 200. The latching mechanism 310 is locked, the safety switch 100 thus being latched. The latching mechanism 310 can be released, thus unlatched, by the electromagnetic release mechanism 300. The unlatching of the latching mechanism 310 has the effect that an energy store, here a mechanical energy store in the form of a spring accumulator 340, in particular in the form of a disk-spring pack, releases the stored energy, here in particular in the form of a movement of the moving contact 200. The spring accumulator 340 is able to be tensioned, thus able to be impinged with energy again, by means of the operating-tool interface 120. Furthermore, after the spring accumulator 340 has been tensioned the latching mechanism by means of the operating-tool interface 120 is transferred from the unlatched position to the latched position again so that a new switching action can again be released by means of the electromagnetic release mechanism 300. The electromagnetic release mechanism 300, the latching mechanism 310 and the spring accumulator 340 here form the drive of the safety switch 100.

The spring accumulator 100 is mechanically connected to the moving contact 200, wherein the spring accumulator 340 is preferably mechanically connected to the moving contact 200 by way of an electrically isolating connection piece 190.

The moving contact is connected in a movable yet electrically conducting manner to a fourth terminal 240, wherein the movable and electrically conducting connection is preferably performed by means of one or a plurality of conductor lines 250, in particular two conductor lines 250.

The fourth terminal 240 is disposed on the open housing rear side 114. The first terminal 210, the second terminal 220 and the third terminal 230 are also disposed on the open housing rear side 114. The first terminal 210, the second terminal 220, the third terminal 230 and the fourth terminal 240 here are disposed so as to be electrically isolated from one another, this here being able to be implemented by dielectric intermediate elements, not shown, by a spacing not shown here but in FIG. 4, or by an isolating coating.

Figure 2:
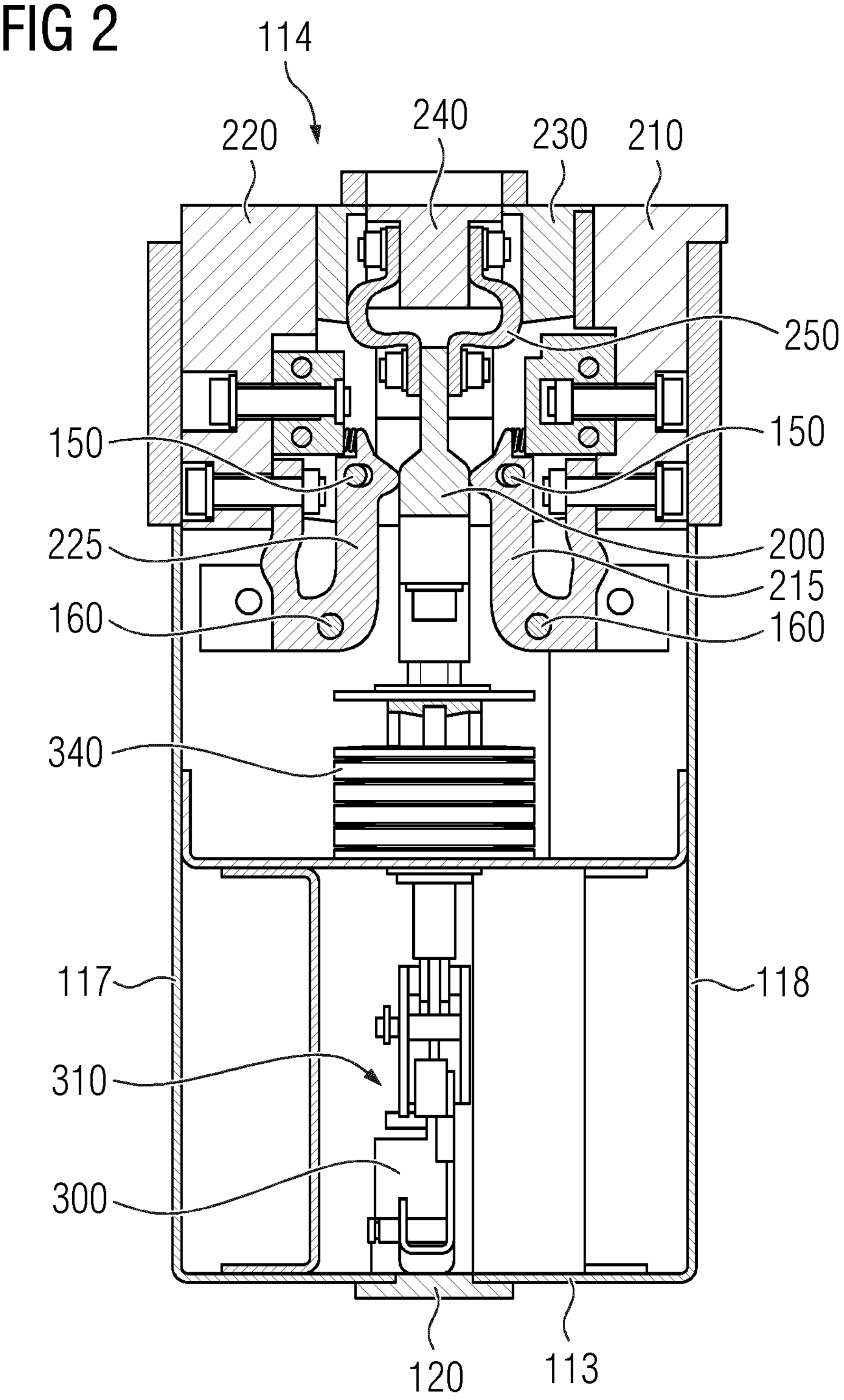
FIG. 2: shows a schematic sectional illustration of a safety switch according to the invention in the closed and unlatched state.

FIG. 2 shows a schematic sectional illustration of the safety switch 100 according to the invention of FIG. 1 in the closed and unlatched state.

The safety switch 100 has a housing, where in an open housing rear side 114, a first housing side 117, a second housing side 118 and a housing front side of the housing are visible in FIG. 2. The housing upper side 115 and the housing lower side 116 are not illustrated in FIG. 2.

In the closed state e illustrated in FIG. 2, the fixed contacts 215, the first first fixed contact 215 and the first second fixed contact 225 being visible here, electrically contact the moving contact 200. The latching mechanism 310 is unlocked, the safety switch 100 thus being unlatched. The latching mechanism 310 is released i.e. unlatched, by the electromagnetic release mechanism 300.

Figure 5:
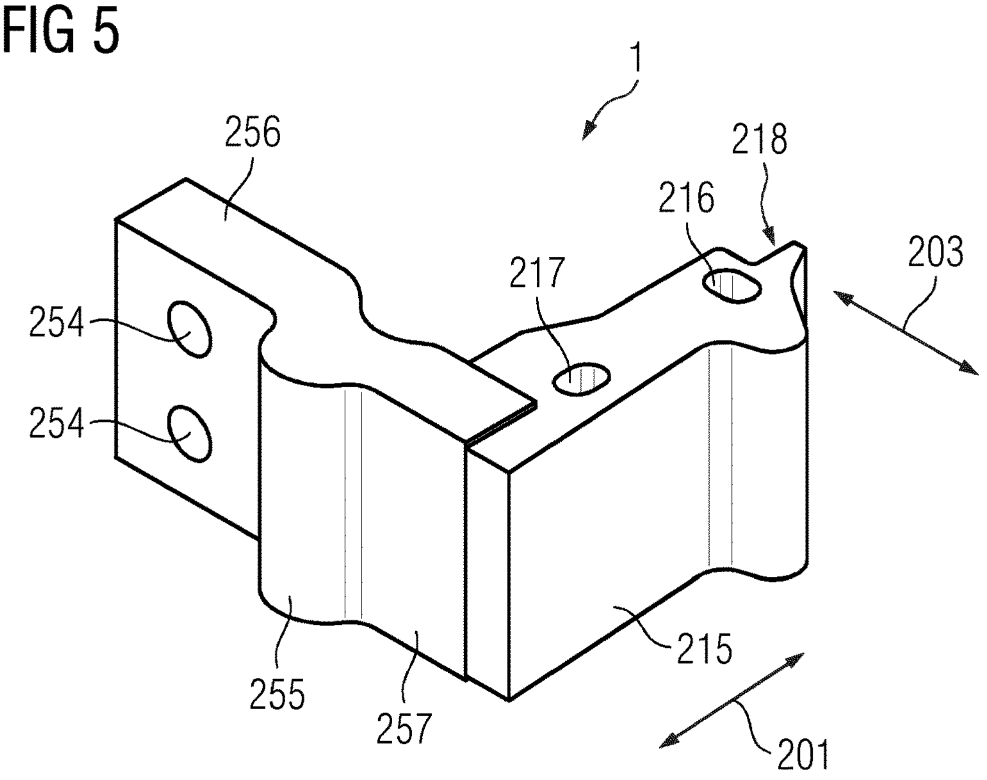
FIG. 5: shows a schematic illustration of a conductor line/contact combination according to the invention for a safety switch according to the invention.
Figure 6:
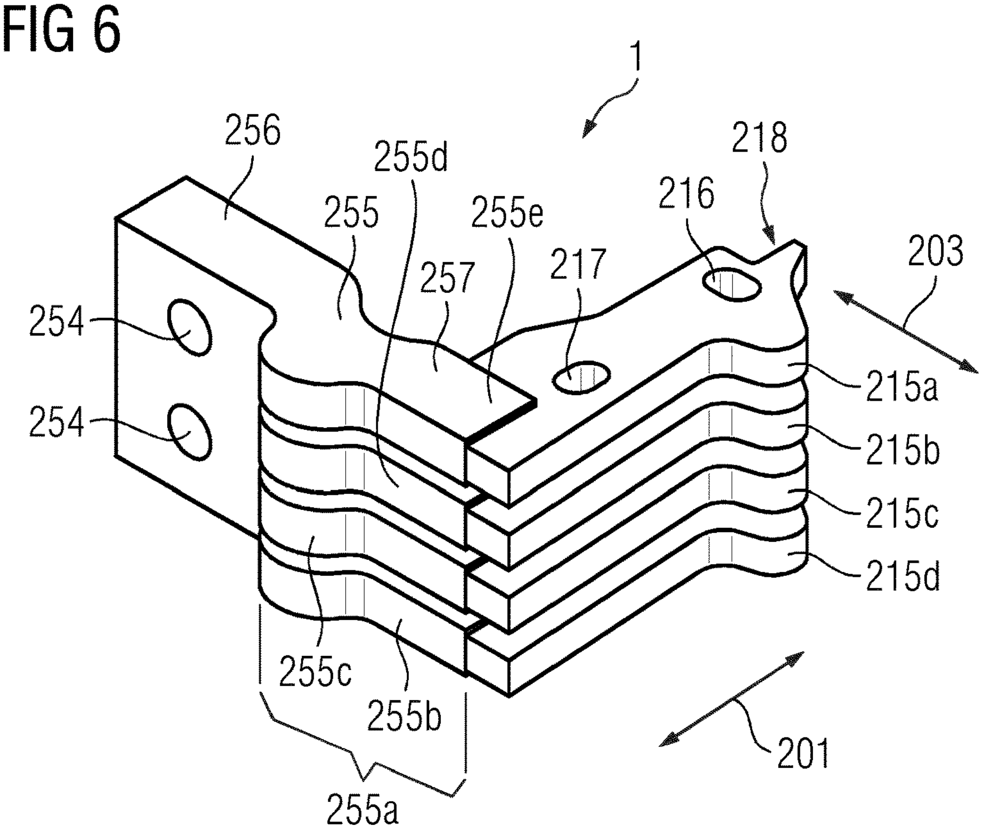
FIG. 6: shows a schematic illustration of a conductor line/contact combination according to the invention with fixed contact fingers for a safety switch according to the invention.

The fixed contacts 215, the first first fixed contact 215 and the first second fixed contact 225 being visible here, are in each case connected to an evasive movement restriction 150 and a fixed contact finger support 160. The first receptacle 216 for the evasive movement restriction 150 and the second receptacle 217 for the fixed contact finger support, which are in each case utilized for connecting, are shown in FIGS. 5 and 6 but not in FIG. 2.

The spring accumulator 340 is able to be tensioned, thus again able to be impinged with energy, by means of the operating-tool interface 120. After the spring accumulator 340 has been tensioned, the latching mechanism by means of the operating-tool interface 120 is furthermore transferred from the unlatched position to the latched position of FIG. 1 again, so that a new switching action can again be released by means of the electromagnetic release mechanism 300. The electromagnetic release mechanism 300, the latching mechanism 310 and the spring accumulator 340 here too form the drive of the safety switch 100.

The moving contact is connected in a movable yet electrically conducting manner to a fourth terminal 240, wherein the movable and electrically conducting connection is preferably performed by means of one or a plurality of conductor lines 250, in particular two or four conductor lines 250.

The fourth terminal 240 is disposed on the open housing rear side 114. The first terminal 210, the second terminal 220 and the third terminal 230 are also disposed on the open housing rear side 114. The first terminal 210, the second terminal 220, the third terminal 230 and the fourth terminal 240 here are disposed so as to be electrically isolated from one another, this being able to be implemented by dielectric intermediate elements, not shown, by a spacing not shown here but in FIG. 4, or by an isolating coating.

Figure 3:
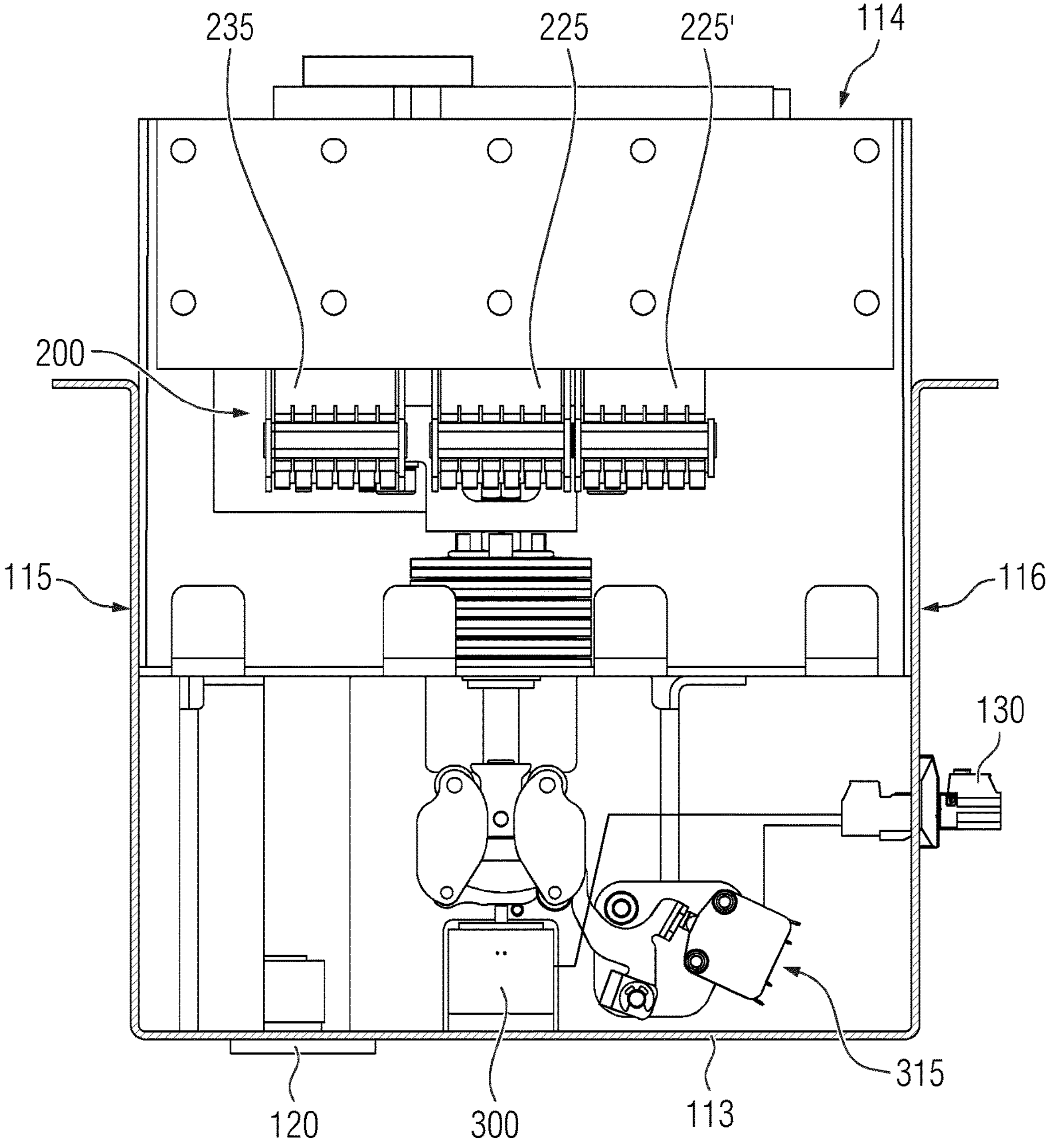
FIG. 3: shows a schematic sectional illustration of a safety switch according to the invention.

FIG. 3 shows a schematic sectional illustration of a safety switch 100 according to the invention with the open housing rear side 114, the housing front side 113 having the operating-tool interface 120, the housing upper side 115 and the housing lower side 116 having connection elements 130. The connection elements 130 serve for electrically and/or optically contacting in order to actuate monitors of the safety switch 100, thus offering a communications interface. Illustrated in the illustration of FIG. 3 are the first second fixed contact 225, the second second fixed contact 225' and the first third fixed contact 235 on one side of the moving contact 200.

Some of the connection elements 130 are connected to the electromagnetic release mechanism 300 so that the electromagnetic release mechanism 300 can be released and optionally also monitored by way of this connection. Furthermore optionally, some connection elements 130 are connected to a position sensor 315 in such a manner that the position of the latching mechanism can be monitored.

Figure 4:
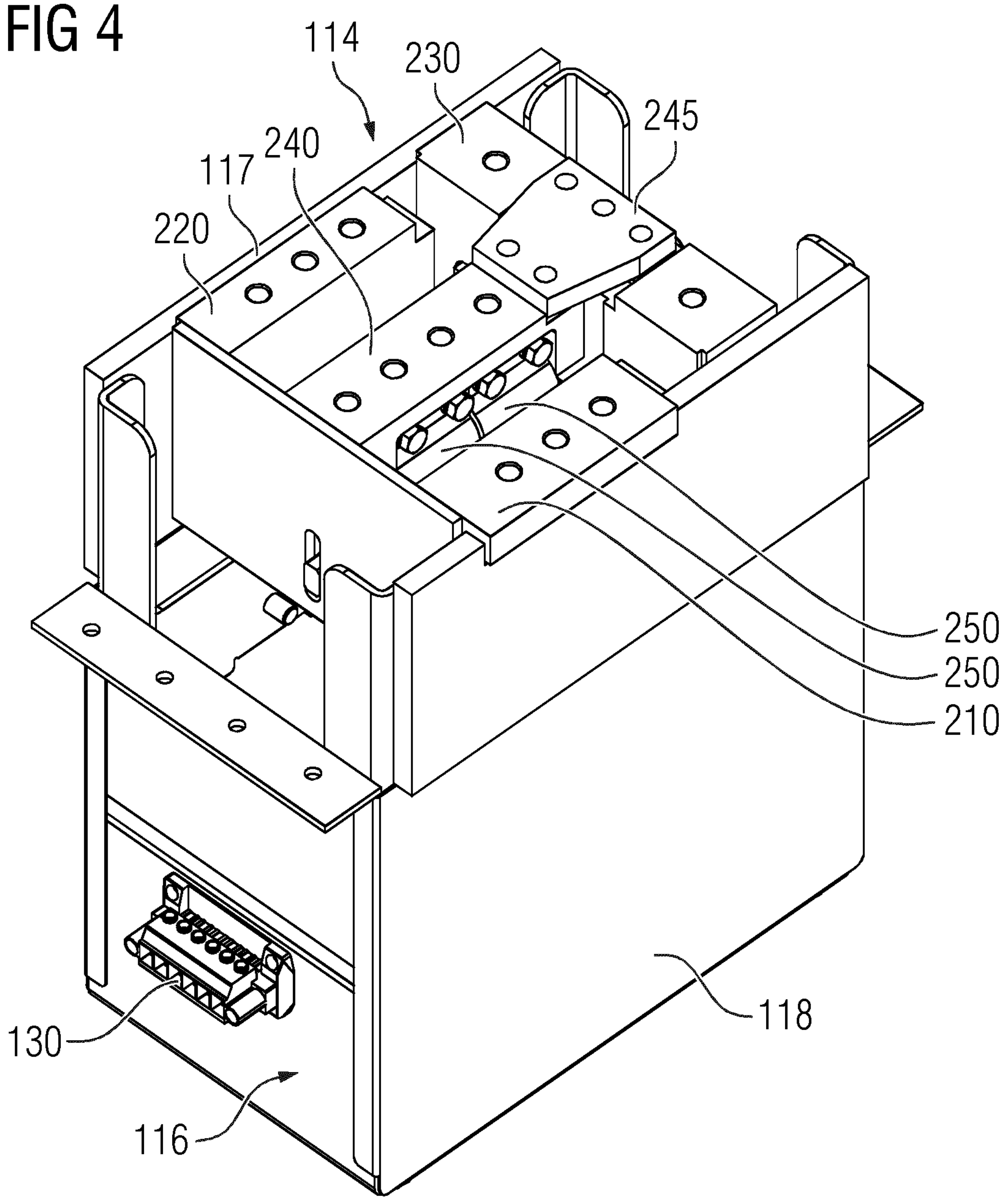
FIG. 4: shows a schematic perspective illustration of a safety switch according to the invention.

FIG. 4 shows a schematic perspective illustration of a safety switch 100 according to the invention, with the open housing rear side 114, the housing lower side 116 having connection elements 130, the first housing side 117 and the second housing side 118.

The first terminal 210, the second terminal 220, the third terminal 230 and the fourth terminal 240 are disposed so as to be electrically isolated from one another on the open housing rear side 114, this here being implemented by a spacing of the first terminal 210, of the second terminal 220, of the third terminal 230 and of the fourth terminal 240. The fourth terminal 240 here is additionally fastened by an optional, electrically isolating holding element 245.

The fourth terminal 240 is connected in an electrically conducting manner to the moving contact 200, not shown here, by way of four visible conductor lines 250, wherein two of the conductor lines 250 are visible and two conductor lines are obscured by the fourth terminal 240.

FIG. 5 shows a schematic illustration of a current line/contact combination 1 according to the invention, having a fixed contact 215 and a moving element 255. The moving element 255 has a first moving element end 256 and a second moving element end 257. The first moving element end 256, by means of welding, pressing and/or soldering/brazing, forms a first moving element connection, and the second moving element end 257, by means of welding, pressing and/or soldering/brazing, forms a second moving element connection. By way of example, the fixed contact 215 is disposed here on the second moving element connection at the second moving element end 257. By way of example, the first moving element connection at the first moving element end 256 here preferably has two fastening means receptacles 254. By way of example, the fixed contact 215 here has a first receptacle 216 for an evasive movement restriction 150 not shown.

Furthermore shown is an optional second receptacle 217 on the fixed contact, the former serving for receiving a fixed contact finger support not shown here.

The fixed contact 215 is connected to the second moving element connection in such a manner that the fixed contact 215 is able to be moved by the moving element 255. In particular, the fixed contact is in this way capable of performing an evasive movement in relation to a moving contact not shown, wherein the moving contact has a moving direction 201, and the fixed contact 215 can perform a movement in a further moving direction 203 which is perpendicular to the moving direction 201 of the moving contact.

The connection between the fixed contact 215 and the second moving element connection is preferably performed by means of welding, pressing, screwing, riveting and/or soldering/brazing, particularly preferably by means of welding.

Furthermore optionally provided are force-introduction points 218 which enable a force, in particular a spring force, to be applied to the fixed contacts 215, which force is preferably directed counter to the possible direction of the evasive movement.

FIG. 6 shows a schematic illustration of a conductor line/contact combination 1 according to the invention, having fixed contact fingers 215*a*, 215*b*, 215*c*, 215*d* and a moving element 255 having a first moving element end 256 and a second moving element end 257.

The moving element 255, in a first moving element portion 255*a*, toward the second moving element end 257 is slotted or segmented in such a manner that moving element end segments 255*b*, 255*c*, 255*d*, 255*e* are formed, each being connected to a fixed contact finger 215*a*, 215*b*, 215*c*, 215*d*. As a result, each of the fixed contact fingers 215*a*, 215*b*, 215*c*, 215*d* in this exemplary embodiment is individually movable.

The first moving element end 256, by means of welding, pressing and/or soldering/brazing, forms a first moving element connection and the second moving element end 257, by means of welding, pressing and/or soldering/brazing, forms a second moving element connection. By way of example, the fixed contact fingers 215*a*, 215*b*, 215*c*, 215*d* are here disposed on the second moving element connection at the second moving element end 257. By way of example, the first moving element connection at the first moving element end 256 here preferably has two fastening means receptacles 254. By way of example, the fixed contact fingers 215*a*, 215*b*, 215*c*, 215*d* here have in each case first receptacles 216 for an evasive movement restriction not shown.

Furthermore shown is an optional second receptacle 217 on the individual fixed contact fingers 215*a*, 215*b*, 215*c*, 215*d*, the former serving for receiving a fixed contact finger support not shown here.

The fixed contact fingers 215*a*, 215*b*, 215*c*, 215*d* are connected to the second moving element connection in such a manner that the fixed contact fingers 215*a*, 215*b*, 215*c*, 215*d* are able to be moved by the moving element 255. In particular, the fixed contact fingers are in this way capable of performing an evasive movement in relation to a moving contact not shown, wherein the moving contact has a moving direction 201, and the fixed contact 215 can perform a movement in a further moving direction 203 which is perpendicular to the moving direction 201 of the moving contact.

The connection between the fixed contact fingers 215*a*, 215*b*, 215*c*, 215*d* and the second moving element connection, or the moving element segments 255*b*, 255*c*, 255*d*, 255*e*, respectively, is preferably performed by means of welding, pressing, screwing, riveting and/or soldering/brazing, particularly preferably by means of welding.

Furthermore optionally provided are force-introduction points 218 which enable a force, in particular a spring force, to be applied to the fixed contact fingers 215*a*, 215*b*, 215*c*, 215*d*, which force is preferably directed counter to the possible direction of the evasive movement.

Figure 7:
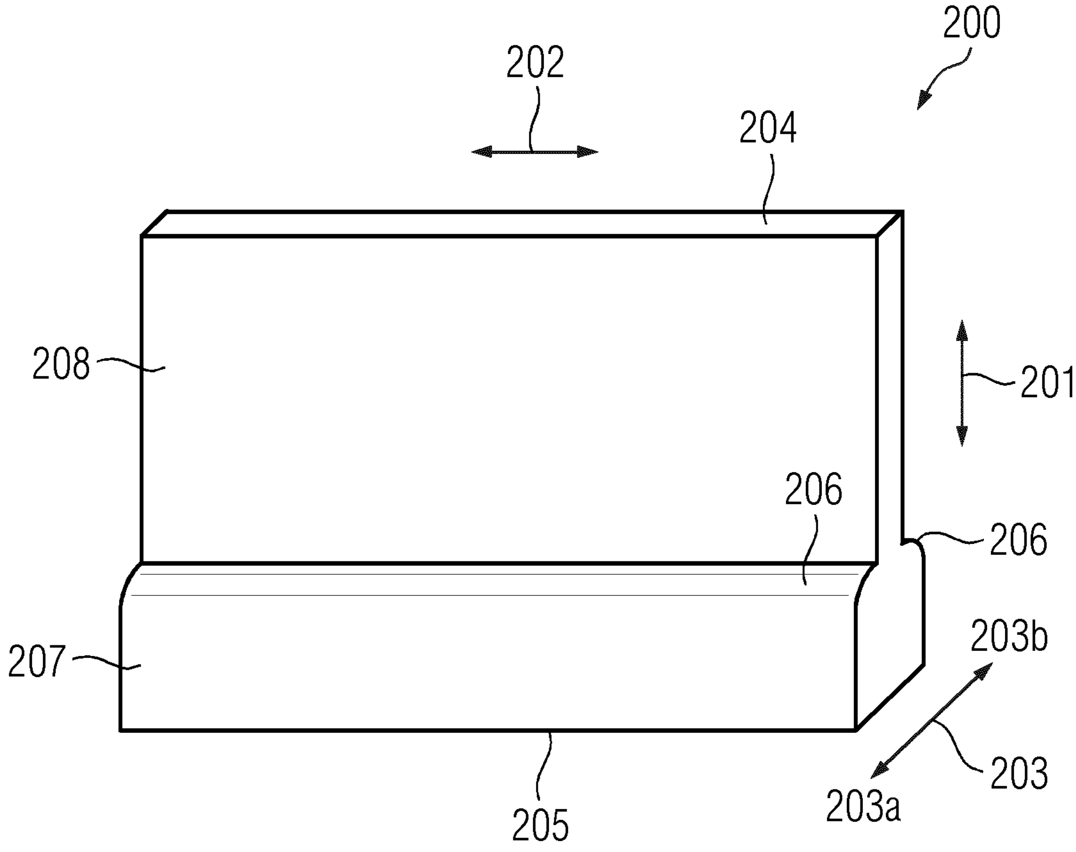
FIG. 7: shows a schematic illustration of a moving contact according to the invention for a safety switch according to the invention.

FIG. 7 shows a schematic illustration of a moving contact 200 according to the invention for a safety switch 100 according to the invention.

The moving contact 200 here possesses a thickening 207 having a side 205 for coupling to the spring accumulator 340, wherein the coupling to the spring accumulator can take place by way of an electrically isolating connection piece 190 shown in FIG. 1. On the side opposite the coupling side 205, the thickening 207 here has an optionally radiused edge 206 or shoulder 206 of the thickening 207 of the moving contact 200.

The thinner region 208 of the moving contact 200 has an upper side 204 of the moving contact 200.

The moving contact has:

- a first extent 201 which is also a moving direction of the moving contact 200;
- a second extent 202 of the moving contact 200; and
- a third extent 203 of the moving contact 200, which is also a further moving direction 203 perpendicular to the moving direction 201 of the moving contact 200.

In the state assembled in an orderly manner, the moving contact is thus movable along the moving direction 201.

The thickening 207 of the moving contact 200 serves for electrically contacting the fixed contacts 215 in the closed state, while the fixed contacts in the opened state are situated in the environment of the thinner region 208 of the moving contact 200, so as to be electrically isolated from the moving contact 200.

As a result of the movement of the moving contact 200 in the moving direction 201 of the moving contact 200, the moving contact can be transferred from the closed state to the open state and vice versa.

Figure 8:
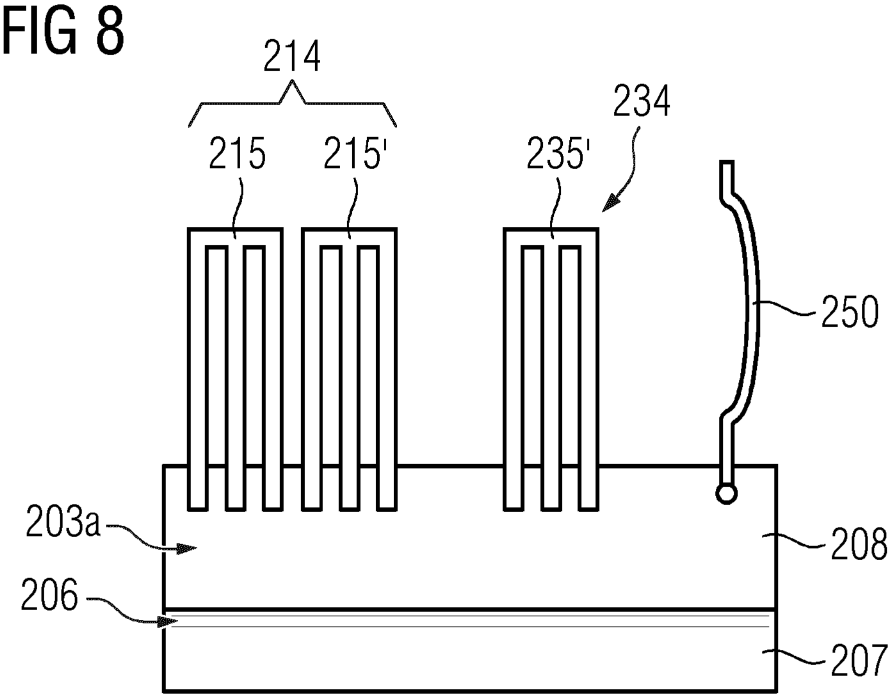
FIG. 8: shows a schematic illustration of an assembly according to the invention of fixed contacts about the moving contact, viewed from a first side of the moving contact, for a safety switch according to the invention.

FIG. 8 shows a schematic illustration of an assembly according to the invention of fixed contacts 215, 215', 235' about the moving contact 200, viewed from a first side 203*a* of the moving contact 200, having a conductor line 250, for a safety switch 100 according to the invention.

The moving contact 200 again has a thickening 207 with a shoulder 206 and a thinner region 208.

Disposed on the first side 203*a* of the moving contact 200 are a first first fixed contact 215 and a second first fixed contact 215' in a first fixed contact assembly 214, and a second third fixed contact 235' of the third fixed contact assembly 234. The open state of the safety switch 100 is illustrated. In the preferred embodiment shown, the first fixed contact assembly 214 and the second third fixed contact 235' are spaced farther apart from one another than the first first fixed contact 215 and the second first fixed contact 215'. This larger spacing between the first fixed contact assembly 214 and the third fixed contact assembly 234 has the effect of an improved electrical isolation of different phases and at the same time offers a compact design of the safety switch 100.

Figure 9:
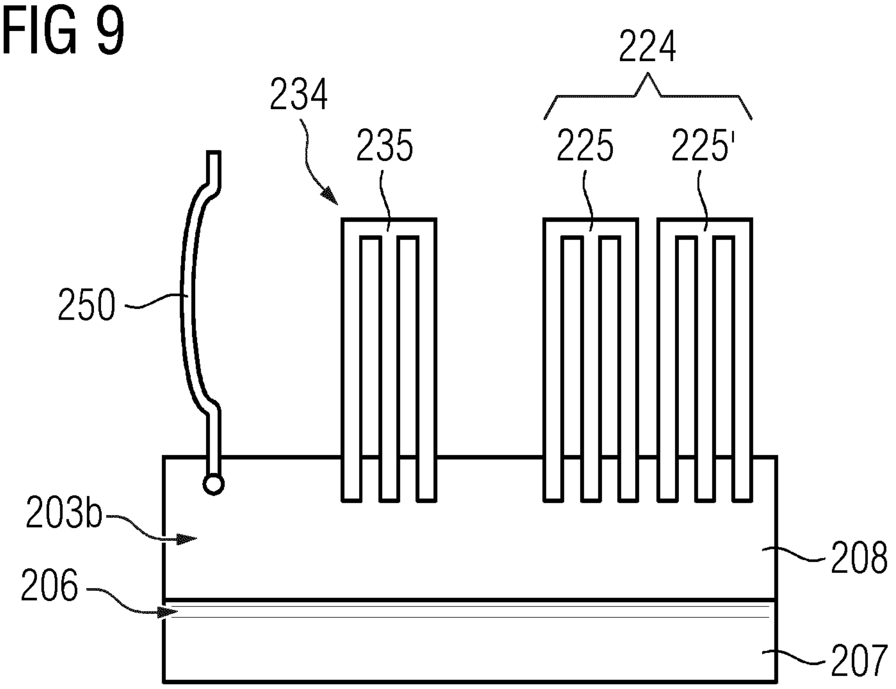
FIG. 9: shows a schematic illustration of an assembly according to the invention of fixed contacts about the moving contact, viewed from a second side of the moving contact, for a safety switch according to the invention.

FIG. 9 shows a schematic illustration of an assembly according to the invention of fixed contacts 225, 225', 235 about the moving contact 200, viewed from a second side 203*b* of the moving contact 200, having a conductor line 250, for a safety switch 100 according to the invention.

The moving contact 200 again has a thickening 207 with a shoulder 206 and a thinner region 208.

Disposed on the second side 203*b* of the moving contact 200 are a first second fixed contact 225 and a second second fixed contact 225' in a second fixed contact assembly 224, and a first third fixed contact 235 of the third fixed contact assembly 234. The open state of the safety switch 100 is illustrated. In the preferred embodiment shown, the second fixed contact assembly 224 and the first third fixed contact 235 are spaced farther apart from one another than the first second fixed contact 225 and the second second fixed contact 225'. This larger spacing between the second fixed contact assembly 224 and the third fixed contact assembly 234 has the effect of an improved electrical isolation of different phases and at the same time offers a compact design of the safety switch 100.

LIST OF REFERENCE SIGNS

1 Conductor line/contact combination
100 Rapid safety switch
110 Switch housing of the rapid safety switch (100)
112 Housing external sides, total of six
113 Housing front side
114 Open housing rear side
115 Housing upper side
116 Housing lower side
117 First housing side
118 Second housing side
120 Operating-tool interface
130 Connection elements
150 Evasive movement restriction
160 Fixed contact finger support
190 Electrically isolating connection piece
200 Moving contact
201 First extent of the moving contact and moving direction of the moving contact 200
202 Second extent of the moving contact 200
203 Third extent of the moving contact 200 and further moving direction perpendicular to the moving direction of the moving contact 200
203*a* First side of the moving contact 200
203*b* Second side of the moving contact 200
204 Upper side of the moving contact 200
205 Side for coupling to the spring accumulator 340
206 Radiused edge; shoulder of the thickening 207 of the moving contact 200
207 Thickening on the moving contact 200
208 Thinner region of the moving contact 200
210 First terminal
214 First fixed contact assembly
215 First first fixed contact and fixed contact
215' Second first fixed contact
215*a* First fixed contact finger
215*b* Second fixed contact finger
215*c* Third fixed contact finger
215*d* Fourth fixed contact finger
216 First receptacle
217 Second receptacle
218 Force-introduction points
220 Second terminal
224 Second fixed contact assembly
225 First second fixed contact
225' Second second fixed contact
230 Third terminal
234 Third fixed contact assembly
235 First third fixed contact
235' First third fixed contact
240 Fourth terminal
245 Holding element
250 Conductor line
254 Fastening means receptacle
255 Moving element
255*a* First moving element portion

255*b* Moving element segment
255*c* Moving element segment
255*d* Moving element segment
255*e* Moving element segment
256 First moving element end
257 Second moving element end
300 Electromagnetic release mechanism
310 Latching mechanism
315 Position encoder
340 Spring accumulator

The invention claimed is:

1. A rapid safety switch, comprising:

a switch housing, said switch housing having:
- six housing external sides, including a housing front side, an open housing rear side, a housing upper side, a housing lower side, a first housing side, and a second housing side;
- an operating-tool interface to be operated through one of said housing external sides; and
- one or more connection elements for controlling the rapid safety switch;

an electromagnetic release mechanism configured to unlatch the rapid safety switch and a moving contact to be moved by a spring accumulator, said spring accumulator being latched in a biased position, and to be released from being latched by said electromagnetic release mechanism;

said moving contact being movable between a first position and a second position, and wherein, in the first position, said moving contact:
- is connected electrically conductively to a fourth terminal; and
- is electrically isolated from a first terminal and from a second terminal and from a third terminal; and in the second position, said moving contact:
- is connected electrically conductively to the fourth terminal; and
- is in electrically conductive contact with the first terminal and with the second terminal and with the third terminal; and said moving contact of the rapid safety switch, upon being unlatched by the electromagnetic release mechanism, moving from the first position to the second position, and said moving contact of the rapid safety switch being configured to be moved from the second position to the first position by way of said operating-tool interface;

a first fixed contact assembly connected electrically conductively to the first terminal, a second fixed contact assembly connected electrically conductively to the second terminal, and a third fixed contact assembly connected electrically conductively to the third terminal;

said moving contact being configured, when transitioning from the first position to the second position, to contact substantially simultaneously said first fixed contact assembly, said second fixed contact assembly, and said third fixed contact assembly, and wherein;

said moving contact has a first extent lying parallel to moving directions of said moving contact, a second extent, and a third extent; and said moving contact along the first extent is formed with a thickening in the third extent, and wherein, in the second position, said first fixed contact assembly, said second fixed contact assembly and said third fixed contact assembly electrically contact said moving contact on said thickening.

2. The rapid safety switch according to claim 1, wherein, in the first position, said first fixed contact assembly, said second fixed contact assembly and said third fixed contact assembly are disposed on a region of said moving contact which is thinner in comparison with said thickening, such that said first fixed contact assembly, said second fixed contact assembly and said third fixed contact assembly in the first position are spaced apart from said moving contact and do not electrically contact said moving contact.

3. The rapid safety switch according to claim 1, wherein:
- said first fixed contact assembly has a first fixed contact on a first side of said moving contact and a second fixed contact on the first side of said moving contact;
- said second fixed contact assembly has a first second fixed contact on a second side of said moving contact and a second second fixed contact on the second side of said moving contact; and
- said third fixed contact assembly has a first third fixed contact on the second side of said moving contact and a second third fixed contact on the first side of said moving contact.

4. The rapid safety switch according to claim 3, wherein said first fixed contact assembly, said second fixed contact assembly and said third fixed contact assembly are in each case impinged by a force and disposed in such a manner that said first fixed contact assembly, said second fixed contact assembly and said third fixed contact assembly in the first position each do not electrically contact said moving contact, and in the second position electrically contact said moving contact and are pushed onto said moving contact by a holding force.

5. The rapid safety switch according to claim 4, wherein each of said fixed contacts is formed by a conductor line-contact combination, and wherein:
- each of said conductor line-contact combinations is formed by:
  - a movable element which is formed with at least one of a woven-fabric tape, strands, or blades, and wherein said movable element:
    - has a first moving element end and a second moving element end; and
    - said first moving element end has a first moving element connection which is formed by a process selected from the group consisting of welding, pressing, soldering and brazing, and said second moving element end has a second moving element connection which is formed by a process selected from the group consisting of welding, pressing, soldering, and brazing;
  - a fixed contact which is disposed on said first moving element connection or said second moving element connection; and
- said fixed contact is disposed to be movable by said movable element.

6. The rapid safety switch according to claim 5, wherein each fixed contact has one, two or more fixed contact fingers, and wherein said fixed contact fingers at said first moving element end or said second moving element end are individually connected to said movable element.

7. The rapid safety switch according to claim 5, wherein:
- each conductor line-contact combination is disposed in a U-shape, with a first leg of a U and a second leg of a U, such that,
- in the second position of the rapid safety switch, a current flowing through said conductor line-contact combinations causes a repellant force between the respective first leg of the U and the second leg of the U, and thus pushes in each case said fixed contact against said moving contact, thereby increasing a contact pressure.

8. The rapid safety switch according to claim 1, wherein: said first terminal, said second terminal, said third terminal and said fourth terminal are disposed on a side opposite said electromagnetic release mechanism; and said moving contact is connected to said fourth terminal by way of one or more conductor lines.

9. The rapid safety switch according to claim 8, wherein a current supply to said moving contact is effected on a same side as the connections for said fixed contacts.

* * * * *